(12) United States Patent
Chao

(10) Patent No.: US 7,437,956 B2
(45) Date of Patent: Oct. 21, 2008

(54) PULL TESTING MECHANISM

(75) Inventor: Ling-Hsi Chao, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 17 days.

(21) Appl. No.: 11/762,028

(22) Filed: Jun. 12, 2007

(65) Prior Publication Data
US 2007/0289299 A1    Dec. 20, 2007

(30) Foreign Application Priority Data
Jun. 19, 2006    (TW) .............................. 95121865 A

(51) Int. Cl.
*G01L 1/26* (2006.01)
(52) U.S. Cl. ................................. 73/862.393
(58) Field of Classification Search ............ 73/862.393, 73/862.08
See application file for complete search history.

(56) References Cited
U.S. PATENT DOCUMENTS 4,373,458 A * 2/1983 Dorosz et al. .......... 112/470.06
4,423,846 A * 1/1984 Föhl .......................... 242/374
2006/0283871 A1* 12/2006 Prescott ........................ 221/9
2008/0028760 A1* 2/2008 Bedwell et al. ............... 60/504

\* cited by examiner

*Primary Examiner*—Max Noori
(74) *Attorney, Agent, or Firm*—Quintero Law Office

(57) ABSTRACT

A pull testing mechanism. A first fixed member and a second fixed member are disposed on a base and oppose each other. A first movable member and a second movable member are movably connected to the first and second fixed members, respectively. A first rotating member includes a first rod, a second rod, and a first hook. The first rod is connected to the first movable member and second rod. The second rod abuts the first fixed member. The first hook is connected to the second rod and under the base. A second rotating member includes a third rod, a fourth rod, and a second hook. The third rod is connected to the second movable member and fourth rod. The fourth rod abuts the second fixed member. The second hook is connected to the fourth rod. A third movable member movably abuts between the first and second movable members.

8 Claims, 5 Drawing Sheets

US 7,437,956 B2

PULL TESTING MECHANISM

BACKGROUND OF THE INVENTION

1. Field of the Invention

The invention relates to a pull testing mechanism, and more particularly to a pull testing mechanism enhancing reliability of a pull test for keycaps.

2. Description of the Related Art

Keycaps are usually separated from a keyboard due to improper operation or exertion by an operator. To insure firm attachment between keycaps and a keyboard, a pull test must be performed to ensure quality of the keyboard.

Conventional pull tests for keycaps are manually performed, increasing labor costs and reducing reliability of the pull tests.

Hence, there is a need for a pull testing mechanism enhancing reliability of a pull test for keycaps.

BRIEF SUMMARY OF THE INVENTION

A detailed description is given in the following embodiments with reference to the accompanying drawings.

An exemplary embodiment of the invention provides a pull testing mechanism comprising a base, a first fixed member, a second fixed member, a first movable member, a second movable member, a first rotating member, a second rotating member, and a third movable member. The first fixed member is disposed on the base. The second fixed member is disposed on the base and opposite the first fixed member. The first movable member is movably connected to the first fixed member. The second movable member is movably connected to the second fixed member and opposite the first movable member. The first rotating member comprises a first rod, a second rod, and a first hook. The first rod is connected to the first movable member and second rod. The second rod abuts the first fixed member and extends to the underside of the base. The first hook is connected to the second rod and under the base. The second rotating member comprises a third rod, a fourth rod, and a second hook. The third rod is connected to the second movable member and fourth rod. The fourth rod abuts the second fixed member and extends to the underside of the base. The second hook is connected to the fourth rod and under the base. The third movable member movably abuts between the first and second movable members. When the third movable member moves, the first and second movable members respectively move with respect to the first and second fixed members, the second rod and first hook rotate at a first angle by movement of the first movable member, and the fourth rod and second hook rotate at a second angle by movement of the second movable member.

The pull testing mechanism further comprises a first resilient member and a second resilient member. The first resilient member is connected between the first fixed member and the first movable member. The second resilient member is connected between the second fixed member and the second movable member.

The pull testing mechanism further comprises a first guide bar and a second guide bar respectively connected to the first and second fixed members. The third movable member moves on the first and second guide bars.

The pull testing mechanism further comprises a first pull bar and a second pull bar respectively connected to the first and second rotating members. The first and second pull bars respectively pull the first and second rotating members.

The first movable member comprises a first positioning groove. The second movable member comprises a second positioning groove. The first and third rods are respectively disposed in the first and second positioning grooves.

The second rod is disposed between the first fixed member and the first movable member. The fourth rod is disposed between the second fixed member and the second movable member.

The third movable member comprises a swelled portion abutting the first and second movable members. The swelled portion forces the first and second movable members to respectively move with respect to the first and second fixed members when the third movable member moves.

The profile of the swelled portion is complementary to those of the first and second movable members.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
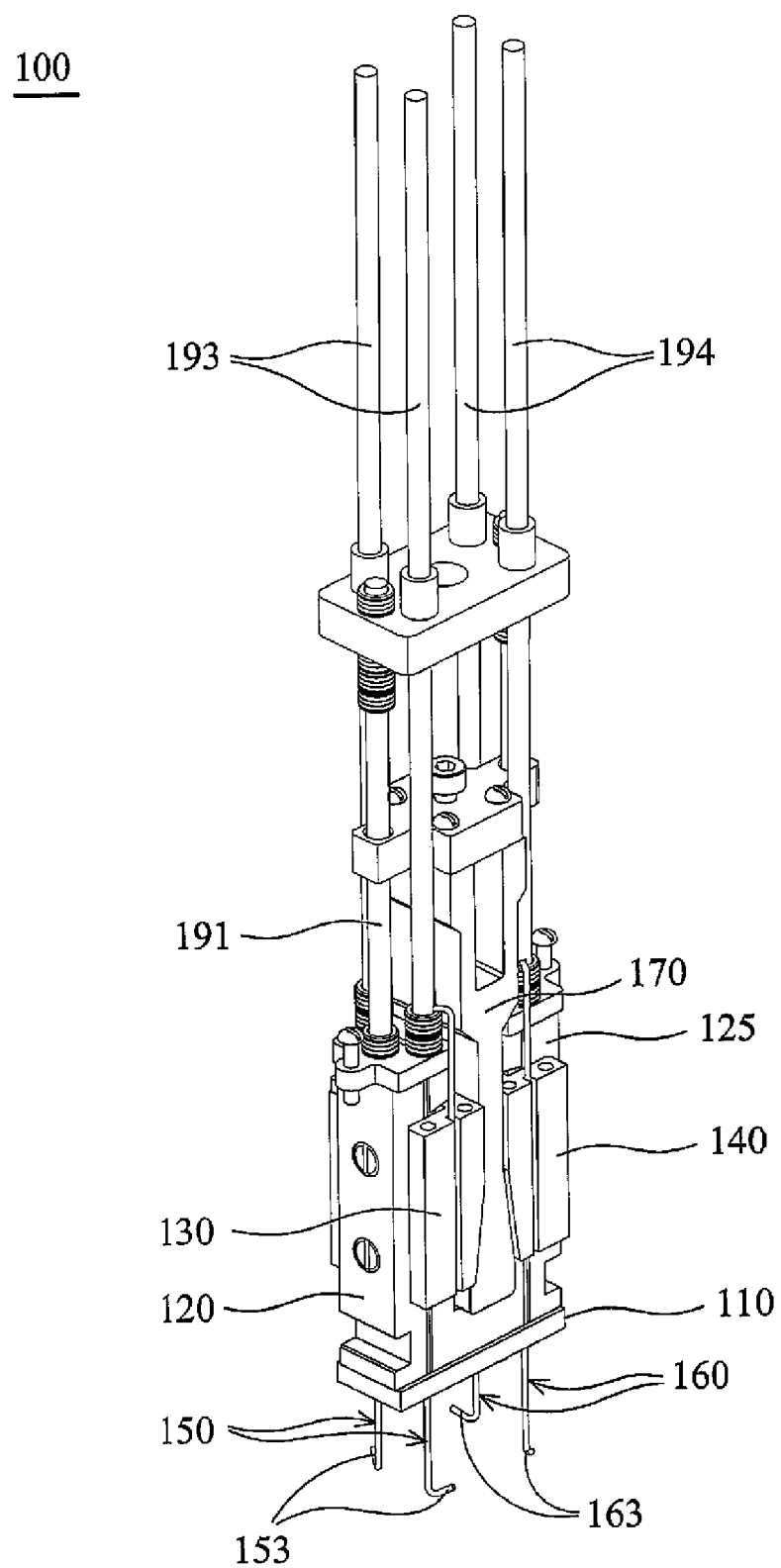
FIG. 1A is a schematic perspective view showing a pull testing mechanism of the invention in an operational mode.

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1A, 1B, 2, 3A, and 3B, a pull testing mechanism 100 comprises a base 110, a first fixed member 120, a second fixed member 125, a first movable member 130, a second movable member 140, two symmetric first rotating members 150, two symmetric second rotating members 160, a third movable member 170, a first resilient member 180, a second resilient member 185, a first guide bar 191, a second guide bar 192, two symmetric first pull bars 193, and two symmetric second pull bars 194.

As shown in FIGS. 1A, 1B, 3A, and 3B, the first fixed member 120 and second fixed member 125 are disposed on the base 110. The first fixed member 120 is opposite the second fixed member 125.

Figure 2:
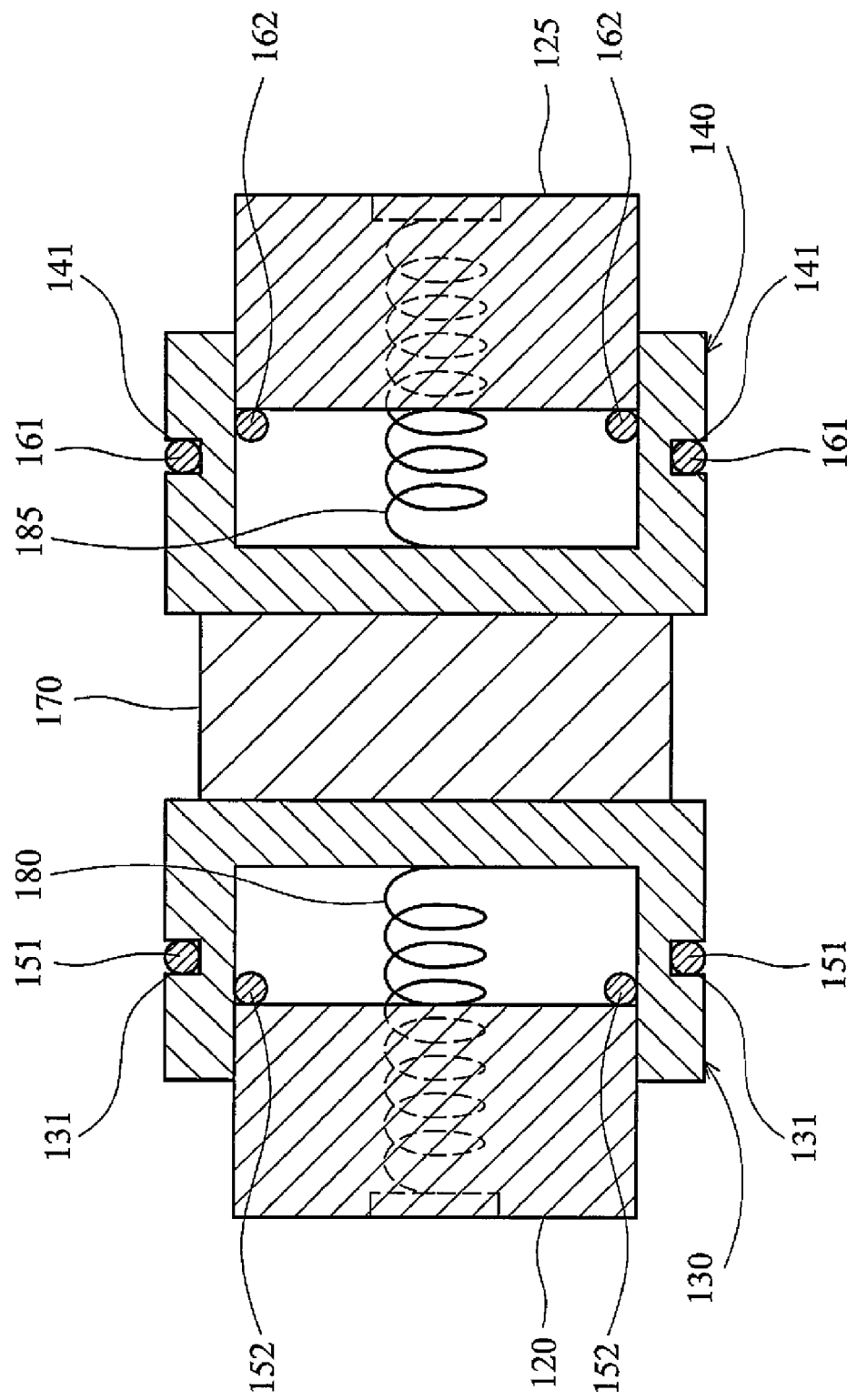
FIG. 2 is a schematic cross section taken along line A-A of FIG. 1B.

The first movable member 130 and second movable member 140 are movably connected to the first fixed member 120 and second fixed member 125, respectively. The first movable member 130 is opposite the second movable member 140. Specifically, as shown in FIG. 2, the first resilient member 180 is connected between the first fixed member 120 and the first movable member 130, and the second resilient member 185 is connected between the second fixed member 125 and the second movable member 140. Accordingly, the first movable member 130 moves with respect to the first fixed member 120 by the first resilient member 180, and the second movable member 140 moves with respect to the second fixed member 125 by the second resilient member 185. Additionally, the first movable member 130 comprises two symmetric first positioning grooves 131, and the second movable member 140 comprises two symmetric second positioning grooves 141.

As shown in FIGS. 1A, 1B, 2, 3A, and 3B, each first rotating member 150 comprises a first rod 151, a second rod 152, and a first hook 153. Each first rod 151 is connected to the first movable member 130 and each second rod 152. Each second rod 152 abuts the first fixed member 120 and extends to the underside of the base 110. Each first hook 153 is connected to each second rod 152 and under the base 110. Specifically, each first rod 151 is disposed in each first positioning groove 131 of the first movable member 130, and each second rod 152 is disposed between the first fixed member 120 and the first movable member 130.

Each second rotating member 160 comprises a third rod 161, a fourth rod 162, and a second hook 163. Each third rod 161 is connected to the second movable member 140 and each fourth rod 162. Each fourth rod 162 abuts the second fixed member 125 and extends to the underside of the base 110. Each second hook 163 is connected to each fourth rod 162 and under the base 110. Similarly, each third rod 161 is disposed in each second positioning groove 141 of the second movable member 140, and each fourth rod 162 is disposed between the second fixed member 125 and the second movable member 140.

The third movable member 170 movably abuts between the first movable member 130 and the second movable member 140. Specifically, the third movable member 170 comprises a swelled portion 171 abutting the first movable member 130 and second movable member 140. Accordingly, the profile of the swelled portion 171 may be complementary to those of the first movable member 130 and second movable member 140.

The first guide bar 191 and second guide bar 192 are respectively connected to the first fixed member 120 and second fixed member 125. The third movable member 170 moves on the first guide bar 191 and second guide bar 192.

Each first pull bar 193 is connected to each first rotating member 150. Each second pull bar 194 is connected to each second rotating member 160. Moreover, each first pull bar 193 and each second pull bar 194 may be selectively connected to a pull force measuring device (not shown), respectively.

The following description is directed to operation of a pull test for a keycap using the pull testing mechanism 100.

Figure 3A:
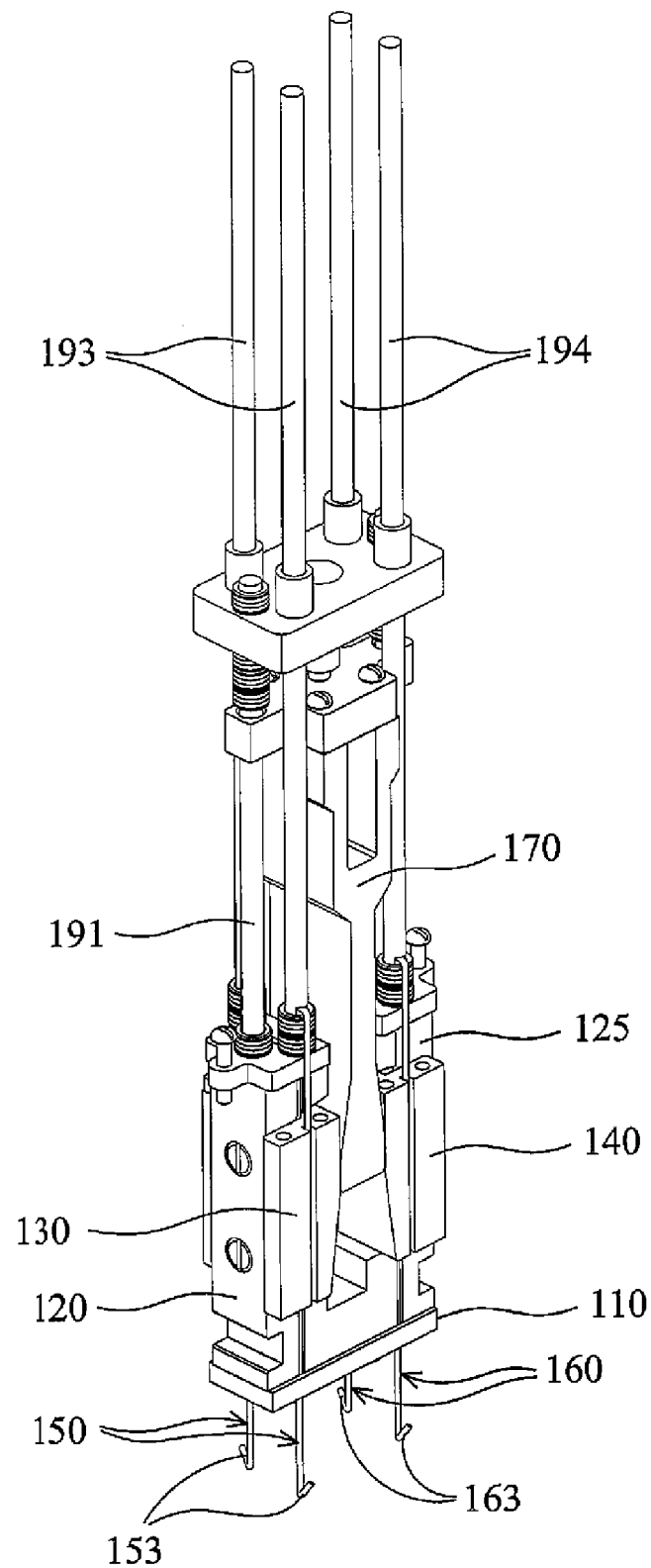
FIG. 3A is a schematic perspective view showing the pull testing mechanism of the invention in another operational mode.
Figure 3B:
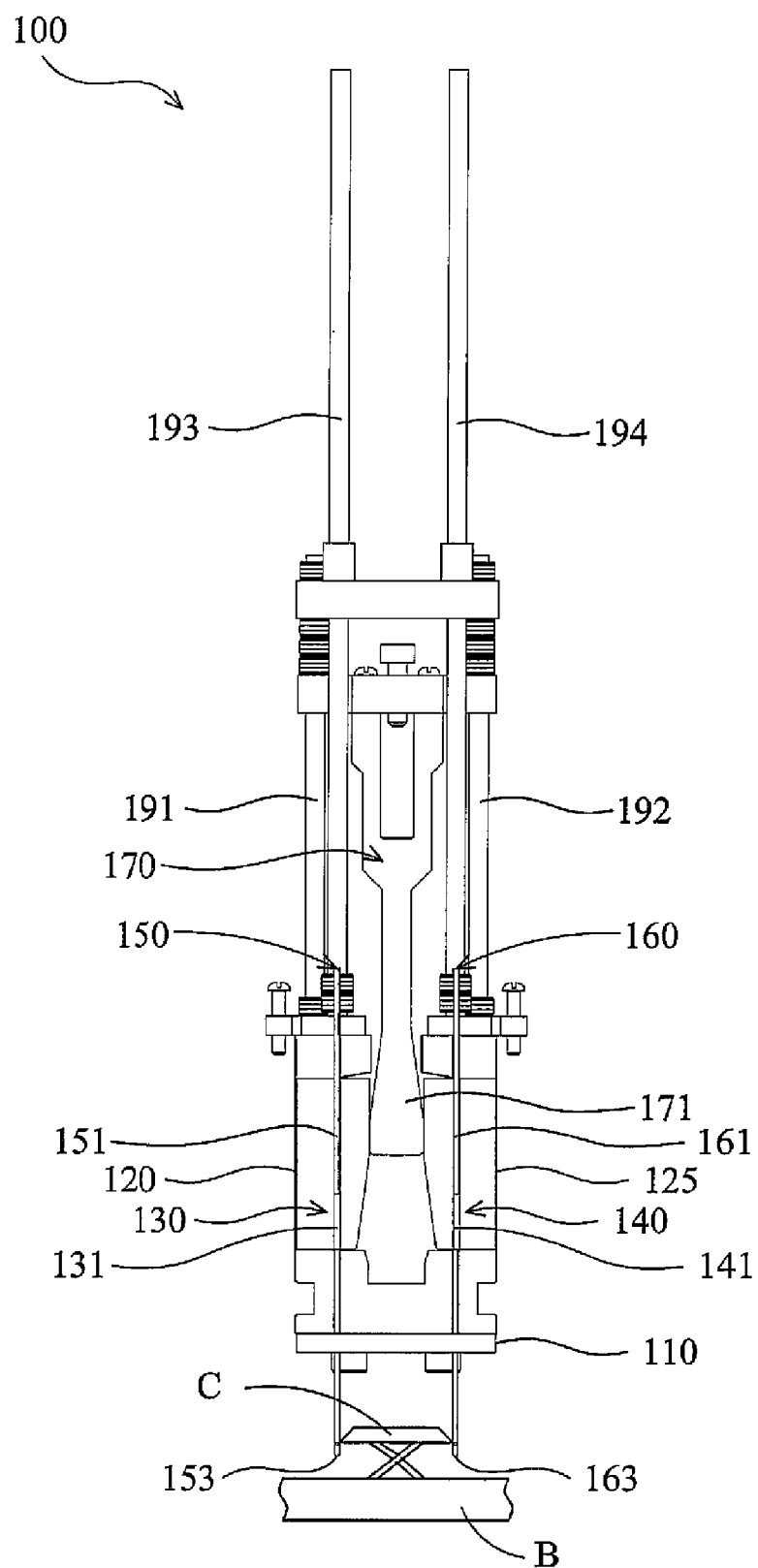
FIG. 3B is a schematic front view of FIG. 3A.

As shown in FIG. 3B, the third movable member 170 is moved upward along the first guide bar 191 and second guide bar 192. Namely, the swelled portion 171 of the third movable member 170 is moved to the upper portions of the first movable member 130 and second movable member 140. At this point, the first movable member 130 and second movable member 140 respectively move toward the first fixed member 120 and the first movable member 130 by pushing of the swelled portion 171, the first resilient member 180 is compressed by the first fixed member 120 and first movable member 130, and the second resilient member 185 is compressed by the second fixed member 125 and second movable member 140. Specifically, when the first movable member 130 and second movable member 140 respectively move toward the first fixed member 120 and the second fixed member 125, the second rod 152 and first hook 153 of each first rotating member 150 rotate at a first angle and the fourth rod 162 and second hook 163 of each second rotating member 160 rotate at a second angle which may equal the first angle. At this point, the first hooks 153 are parallel to the second hooks 163. A keyboard B with a keycap C is then placed under the base 110 of the pull testing mechanism 100, with the keycap C located between the first hooks 153 and the second hooks 163 and thereon. Here, the first hooks 153 and second hooks 163 are respectively located near four corners of the keycap C and parallel to edges thereof.

Figure 1B:
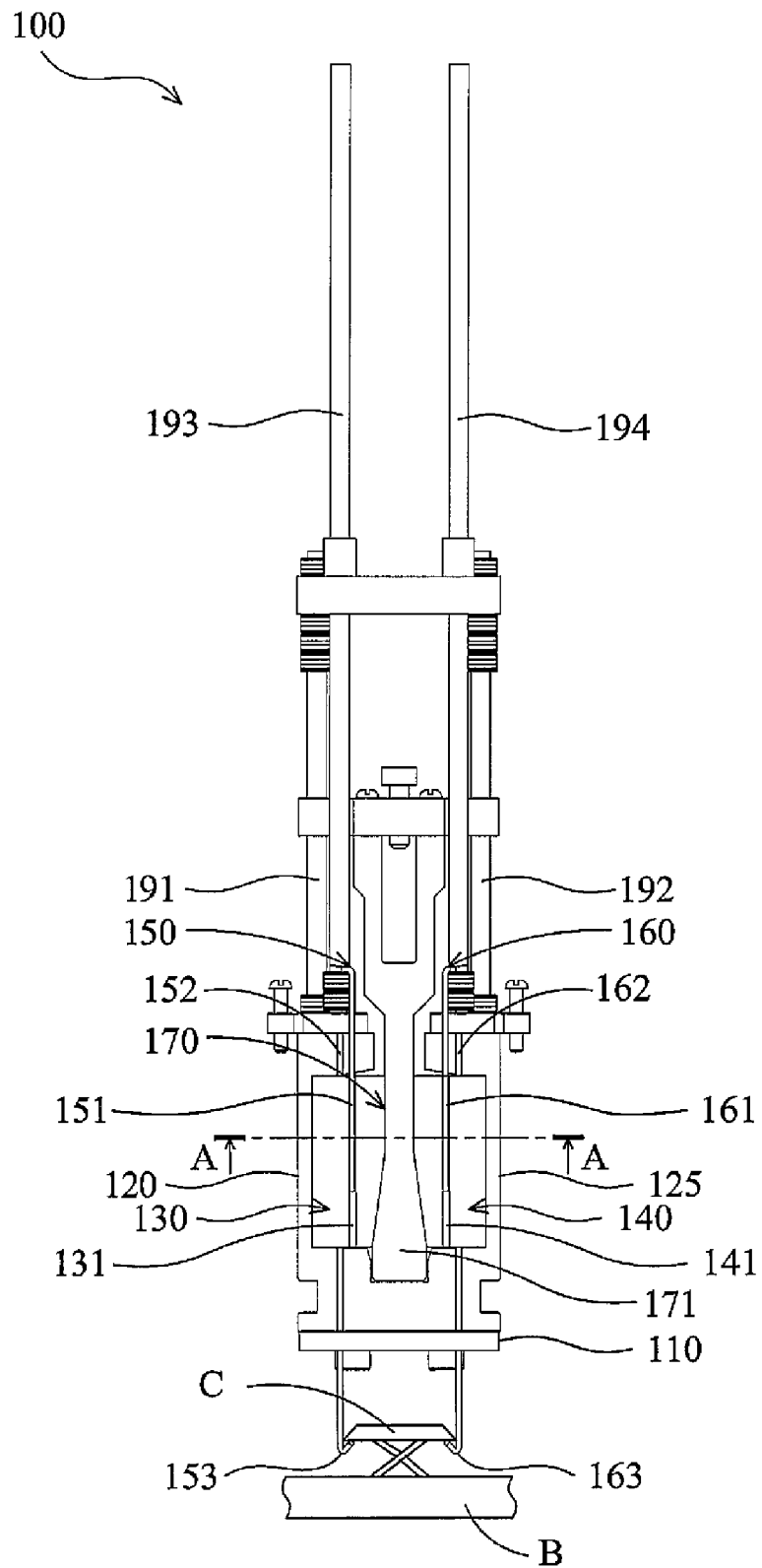
FIG. 1B is a schematic front view of FIG. 1A.

As shown in FIG. 1B, the third movable member 170 is moved downward along the first guide bar 191 and second guide bar 192. Namely, the swelled portion 171 of the third movable member 170 is moved to the lower portions of the first movable member 130 and second movable member 140. At this point, the first movable member 130 and second movable member 140 respectively move away from the first fixed member 120 and first movable member 130 by resilience provided by the first resilient member 180 and second resilient member 185. Specifically, when the first movable member 130 and second movable member 140 respectively move away from the first fixed member 120 and the second fixed member 125, the second rod 152 and first hook 153 of each first rotating member 150 reversely rotate at the first angle and the fourth rod 162 and second hook 163 of each second rotating member 160 reversely rotate at the second angle which may equal the first angle. Namely, the first hooks 153 and second hooks 163 simultaneously rotate and enter the keycap C.

The first pull bars 193 and/or second pull bars 194 can be pulled upward, pulling the first rotating members 150 and/or second rotating members 160. At this point, the first hooks 153 and/or second hooks 163 engage and upward pull the edges of the keycap C. Then, by observing readings on the pull force measuring device connected to the first pull bars 193 and/or second pull bars 194, strength of attachment between the keycap C and the keyboard B is obtained. An operator can thus judge whether the strength of attachment is within a desirable range or not.

Moreover, multiple pull testing mechanisms 100 may be combined in parallel, such that a pull test for multiple keycaps on a keyboard can be performed.

In conclusion, the disclosed pull testing mechanism can reduce labor costs for a pull test for a keycap and effectively enhance reliability thereof.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pull testing mechanism, comprising:
   a base;
   a first fixed member disposed on the base;
   a second fixed member disposed on the base and opposite the first fixed member;
   a first movable member movably connected to the first fixed member;
   a second movable member movably connected to the second fixed member and opposite the first movable member;
   a first rotating member comprising a first rod, a second rod, and a first hook, wherein the first rod is connected to the first movable member and second rod, the second rod abuts the first fixed member and extends to the underside of the base, and the first hook is connected to the second rod and under the base;
   a second rotating member comprising a third rod, a fourth rod, and a second hook, wherein the third rod is connected to the second movable member and fourth rod, the fourth rod abuts the second fixed member and extends to the underside of the base, and the second hook is connected to the fourth rod and under the base; and a third movable member movably abutting between the first and second movable members, wherein when the third movable member moves, the first and second movable members respectively move with respect to the first and second fixed members, the second rod and first hook rotate at a first angle by movement of the first movable member, and the fourth rod and second hook rotate at a second angle by movement of the second movable member.

2. The pull testing mechanism as claimed in claim 1, further comprising a first resilient member and a second resilient member, wherein the first resilient member is connected between the first fixed member and the first movable member, and the second resilient member is connected between the second fixed member and the second movable member.

3. The pull testing mechanism as claimed in claim 1, further comprising a first guide bar and a second guide bar respectively connected to the first and second fixed members, wherein the third movable member moves on the first and second guide bars.

4. The pull testing mechanism as claimed in claim 1, further comprising a first pull bar and a second pull bar respectively connected to the first and second rotating members, wherein the first and second pull bars respectively pull the first and second rotating members.

5. The pull testing mechanism as claimed in claim 1, wherein the first movable member comprises a first positioning groove, the second movable member comprises a second positioning groove, and the first and third rods are respectively disposed in the first and second positioning grooves.

6. The pull testing mechanism as claimed in claim 1, wherein the second rod is disposed between the first fixed member and the first movable member, and the fourth rod is disposed between the second fixed member and the second movable member.

7. The pull testing mechanism as claimed in claim 1, wherein the third movable member comprises a swelled portion abutting the first and second movable members, and the swelled portion forces the first and second movable members to respectively move with respect to the first and second fixed members when the third movable member moves.

8. The pull testing mechanism as claimed in claim 7, wherein the profile of the swelled portion is complementary to those of the first and second movable members.

* * * * *